United States Patent
Iltis et al.

(10) Patent No.: US 10,310,103 B2
(45) Date of Patent: Jun. 4, 2019

(54) METHOD FOR IMPROVING THE ENERGY RESOLUTION OF GAMMA RAY SCINTILLATION DETECTORS; ASSOCIATED SYSTEM, COMPONENT AND APPLICATIONS

(71) Applicant: Alain Iltis, Troyes (FR)

(72) Inventors: Alain Iltis, Troyes (FR); Hichem Robert René Snoussi, Breviandes (FR)

(73) Assignee: Alain Iltis, Troyes (FR)

( * ) Notice: Subject to any disclaimer, the term of this patent is extended or adjusted under 35 U.S.C. 154(b) by 92 days.

(21) Appl. No.: 15/310,964

(22) PCT Filed: May 18, 2015

(86) PCT No.: PCT/FR2015/051293
§ 371 (c)(1),
(2) Date: Nov. 14, 2016

(87) PCT Pub. No.: WO2015/173530
PCT Pub. Date: Nov. 19, 2015

(65) Prior Publication Data
US 2017/0074992 A1    Mar. 16, 2017

(30) Foreign Application Priority Data
May 16, 2014 (FR) ..................... 14 54417

(51) Int. Cl.
*G01T 1/20* (2006.01)
*G01T 1/36* (2006.01)
*G01T 1/164* (2006.01)
*G01T 1/202* (2006.01)

(52) U.S. Cl.
CPC .......... *G01T 1/2018* (2013.01); *G01T 1/1642* (2013.01); *G01T 1/202* (2013.01); *G01T 1/362* (2013.01); *G01T 1/2023* (2013.01)

(58) Field of Classification Search
CPC ................................................. G01T 1/2018
See application file for complete search history.

(56) References Cited

U.S. PATENT DOCUMENTS

| | | | |
|---|---|---|---|
| 7,405,406 B1* | 7/2008 | Nagarkar | G01T 1/2018 250/366 |
| 2011/0017911 A1* | 1/2011 | Flamanc | C09K 11/02 250/361 R |
| 2015/0331118 A1* | 11/2015 | Iltis | G01T 1/1647 250/362 |

* cited by examiner

*Primary Examiner* — Edwin C Gunberg
(74) *Attorney, Agent, or Firm* — Hauptman Ham, LLP

(57) ABSTRACT

The invention concerns a method for improving the energy resolution of a gamma ray detector comprising a monolithic scintillator and a photodetector segmented during a scintillation event characterized by the following steps:—detecting the time of arrival of the first photons on said photodetector;—counting, during a period T, which is between 2 and 6 times a transfer time (Te), the number and location of the first detected non-scattered photons;—determining the diameter and the position of a disk defined by a set of first non-scattered photons;—determining the position (X, Y) of a scintillation event from the location of said first detected non-scattered photons;—counting the number of the first detected non-scattered photons inside said disk during a period Td greater than a decay time (T) of the scintillator;—defining the energy of a gamma photon, said energy being proportional to the number of non-scattered photons counted inside the disc. The invention also concerns the associated detection system, the microelectronic component and a scintillator crystal treated for use in a PET application, and the use of the detection system according to the invention in PET and SPECT imagers.

20 Claims, 2 Drawing Sheets

METHOD FOR IMPROVING THE ENERGY RESOLUTION OF GAMMA RAY SCINTILLATION DETECTORS; ASSOCIATED SYSTEM, COMPONENT AND APPLICATIONS

TECHNICAL FIELD OF THE INVENTION

The invention relates to the measure of the energy of a source of gamma rays via a scintillation method. More particularly the invention relates to a method for improving the energy resolution of detectors of gamma rays based on scintillators. The invention also relates to the set of current applications of scintillation detectors to the extent that they employ a measure of the energy of the radiation, such as medical imaging, gamma spectroscopy, nuclear physics.

These days, the majority of applications linked to scintillating crystals search for measuring the energy of an incident gamma ray, either in order to constitute a spectrum of the incident radiation and to detect therein characteristic emissions (for example in analysis by neutronic activation), or to verify that the radiation detected is the signal that we are looking for and not the background noise (nuclear imaging: PET, SPECT . . . ). For all these applications, precise knowledge of the energy of the gamma incident photon is one of the most important points of the performance of the detector.

STATE OF THE PRIOR ART

In current technology, in order to measure the energy of a gamma photon, the number of visible photons emitted during an interaction is measured. In effect there is a relation between the energy of an incident gamma photon and the number of visible photons emitted by scintillation which is proper to each type of scintillating crystal. According to the type of crystal selected, this relation is more or less linear. The best scintillators in terms of energy resolution today are lanthanum halides for which linearity is strong for energies >100 KeV. The measuring precision of the energy grows with the number of photons collected and therefore the energy of the incident photon.

But today for a given energy radiation, the fluctuation in the number of photons effectively detected is strong due to several physical effects (depth of interaction, pile-up, variable collection of photons according to geometry . . . ). Several detection events of gamma photons should therefore be accumulated and a statistic created. The Measure of the energy of a single photon by current spectrometers is not very precise.

In current and known configurations, the scintillating crystal which can have various geometries according to the application: plates, bar, cylinder, has an exit face on which the photons emitted by scintillation are collected. These photons are detected by a photodetector (Photomultiplier, Si-PMT . . . ) for a period which depends on characteristics of emission of the scintillator. Typically, the photons emitted are integrated over a period equal of 2 to 3 times at least the decay time $\tau$ (period of decrease of the light emission of the scintillator).

The current solution raises several problems: first, to get a good counting statistic of photons, the radiation emitted by each event over a fairly long period has to be integrated. If, during this period another interaction occurs, the signal is perturbed. Due to the pile-up effect this degrades the precision of measuring the energy.

The second problem consists of the number of collected photons according to the geometry of the crystal. In effect, some photons are lost during reflections on interfaces of the crystal. The number of photons effectively collected varies also according to the depth of interaction in the crystal. The optimum result in terms of energy resolution is often measured for a cylinder. The energy resolutions obtained for plates (SPECT) or pixels (PET) are degraded with respect to this optimum, often by a factor of 1.5 to 2 or more.

Besides, this type of detector does not measure very precisely the time of the interaction because of the problem of the depth of interaction inter alia.

Due to these limitations, the energy of an individual gamma photon is not detected. A big number of individual events are integrated and a graph showing the number of events as a function of their energy is drawn up. Characteristic gamma rays (i.e. 511 KeV) appear as a peak on this graph, which the width of which defines the energy resolution of the detector.

The aim of the invention is therefore to propose a technical solution which:
 improves the energy resolution by taking it to a value near its theoretical maximum given by the ratio number of emitted photons/photon energy
 obtain a value of the energy resolution which is not dependent on the geometry of the detector
 reduces the problem of pile-up, the majority of events can be measured individually
 produces an estimation of the energy of each individual event with an uncertainty of less than twice the theoretical energy resolution of the scintillator
 determines highly precisely the instant of the interaction
 can be adapted to existing crystals by a change of electronics.

Moreover, the invention also describes two means for improving the operation of a time imager such as described in application PCT/FR2013/052672.

DESCRIPTION OF THE INVENTION

The aim of the invention is to propose a method for improving the energy resolution of a gamma radiation detector comprising a monolithic scintillator and a segmented photodetector during a scintillation event, characterised by the following steps:
 detecting the time of arrival of the first photons on said photodetector;
 counting for a period Ti so-called "integration time" consist of between 2 and 6 times a transfer time (Tc), the number of first detected unscattered photons, and determining their localisation;
 determining the diameter and position of a disc inside which a set of unscattered photons is arranged;
 determining the position (X, Y) of a scintillation event from the localisation of said first detected unscattered photons;
 counting the number of unscattered photons arranged inside said disc for a period $T_d$ so-called "counting time" greater than the decay time ($\tau$) of the scintillator;
 defining the energy of a gamma photon, said energy being proportional to the number of unscattered photons counted inside the disc.

Preferably, the photons inside the disc are counted during a period equal to around 2 to 3 times the decay time of said scintillator to reduce the uncertainty during measuring each gamma photon with respect to a conventional method.

Transfer time (Tc) means that the characteristic propagation time of the light in a scintillator, for a scintillator of index n and thickness H·Tc=H/(n/c).

The decay time $\tau$ is defined as the decrease or the decline of the time of the scintillator. If $N_0$ is the total number of photons emitted by this scintillator, the number of photons emitted at the instant t follows the law $N=N_0 \exp(-t/\tau)$.

In particular, the position Z of the interaction is estimated according to the diameter of the disc of the unscattered photons, said position Z being the depth of said interaction.

"Closest instant" means that a temporal gap between the impacts of two gamma photons, between the decay time ($\tau$) and a nanosecond.

The invention also relates to a system for detecting gamma radiation for executing the method hereinabove, comprising a scintillating crystal with an entry face and an exit face polished and coupled by an optical seal of index less than 1.5 to an array of segmented photodetectors, said photodetectors being read by a microelectronic component, characterised in that the system is able to measure the time of arrival of the first photons for a period of around 2 to 6 times a transfer time (Tc), measuring the number and determining the localisation of said first photons, determining the diameter and the position of a disc inside which a set of unscattered photons is arranged, the maximum diameter of said disc being proportional to the thickness of said scintillating crystal, and in that it is able to count the number of photons detected for a period of around 2 to 3 times a decay time ($\tau$) of said scintillator for each pixel to measure the energy of a single gamma photon with a precision greater than twice the theoretical resolution of the scintillating crystal for a given energy.

The time of arrival of the photons and the counting during the period Tris used to determine the position of the unscattered photons. Integration during the period $T_d$ is used to measure the energy of the photon.

According to the invention, the microelectronic reading component is either integrated into a photodetector of digital Si-PM type, or in the form of a separate component of ASIC type in the case of an analogue Si-PM.

Also, the scintillating crystal has geometries in the form of a plate, cylinder or bar.

Further, the scintillating crystal is a lanthanum halide or a lutetium silicate for energy radiation greater than 100 KeV.

Additionally, the scintillating crystal is any type when the photons to be detected have energy greater than 1 MeV.

Advantageously, the scintillating crystal is coupled on the entry face and on the exit face to an array of segmented photodetectors to enhance the precision of measuring the energy resolution.

The invention further relates to a microelectronic component of combined ASIC type used for reading a photodetector of the system hereinabove. Said component comprises an analogue part able to measure an event with a time precision of the order of 100 ps and a digital part. This component is able to measure the time of arrival of the first photons, counting for a period Ti so-called integration time equivalent to 2 to 6 times a transfer time (Tc), the number of photons detected for a pixel, and integrating the number of photons detected over a period $T_d$ of the order of 2 to 3 times the decay time ($\tau$) of the scintillator.

Advantageously this component can also be able to send a time signal when the load of photons which have impacted a pixel of the detector, during the integration time $T_i$, exceeds a predefined threshold.

The invention further relates to a scintillating crystal in the form of a monolithic plate with lateral faces and an entry face for measuring the distribution of light in a PET application; said lateral faces and the entry face are first treated in order to avoid reflection by index step then covered with a black absorbent, in order to cancel out the reflection on said surfaces.

The invention further relates to a scintillating crystal in the form of a monolithic plate with lateral faces and an entry face for measuring the distribution of light of a scintillation event at 511 KeV; said lateral faces and the entry face are covered with an index resin n>1.7; said resin is loaded with absorbent particles, in order to cancel out the reflection on said surfaces.

The invention also relates to use of the detection system hereinabove for improving the energy resolution of scintillators in gamma imagers of SPECT or PET type.

BRIEF DESCRIPTION OF THE FIGURES

Further features, details and advantages of the invention will emerge on reading the following description, with reference to the appended figures, illustrating.

DETAILED DESCRIPTION

Figure 1:
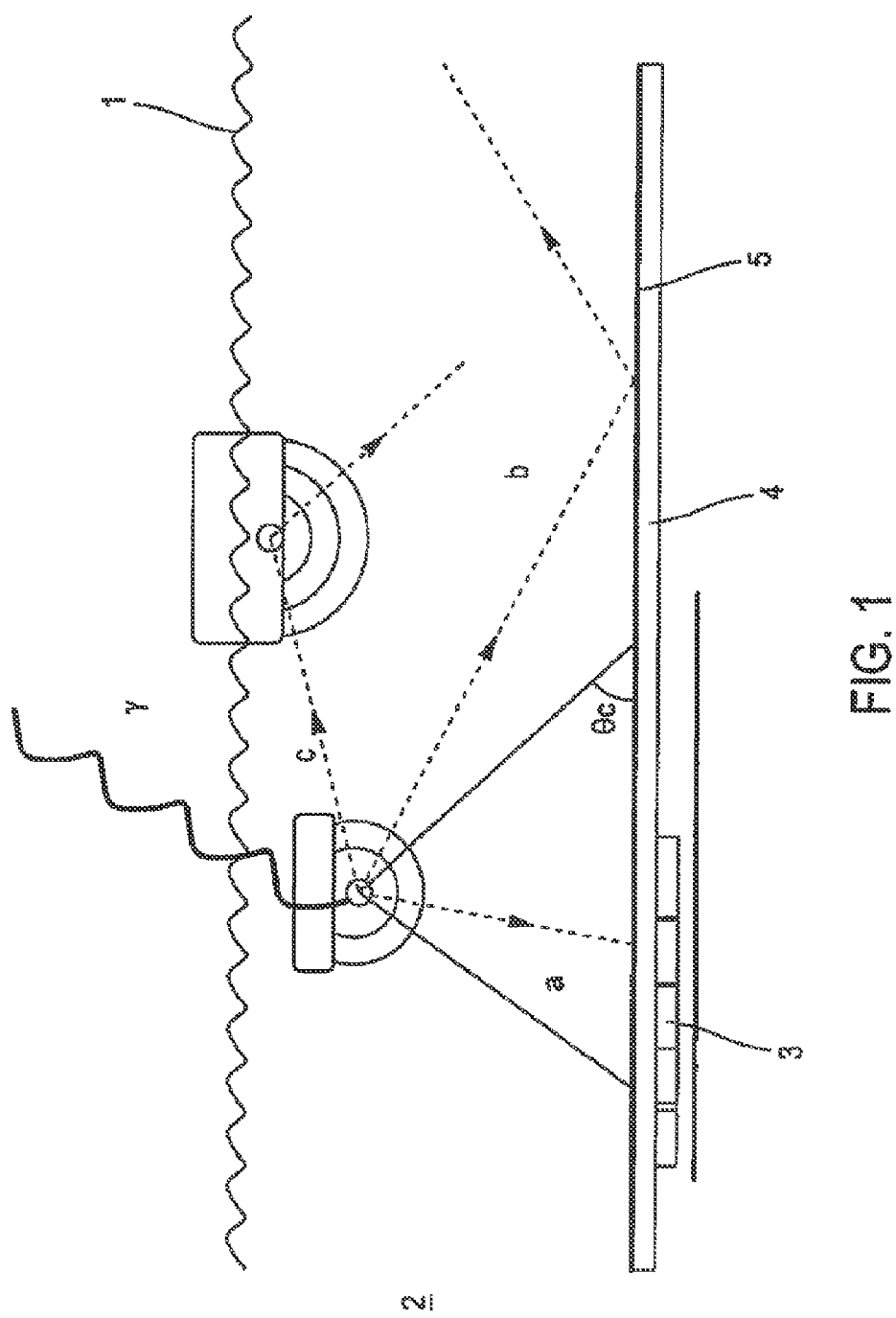
FIG. 1 shows the principle of a gamma photon undergoing a photoelectric effect in a scintillating crystal.

In reference to FIG. 1, the detector comprises the following elements: 1) entry face or rough and scattering upper face of the crystal: Z=0; 2) scintillating crystal ($LaBr_3Ce$); 3) segmented photodetector; 4) optical seal 5) polished exit surface of the crystal. (Z=30 for the examples) see FIG. 1.

FIG. 1 shows the three types of emitted photons, specifically: a) unscattered photons; b) photons reflected on the exit face; c) photons scattered on the entry face.

The present invention differentiates by their spatial and temporal distribution the unscattered photons moving in a straight line from the point of interaction and those having undergone at least one scatter, as indicated by international application No. PCT/FR2013/052672 by the same applicant. However, the information on numbers of unscattered photons is used for measuring energy of the interaction and not for spatial or temporal measuring. Only the unscattered photons are considered for measuring the energy of the interaction.

The unscattered photons are distributed in a cone whereof the vertex is the point of interaction (X, Y, Z, T) and whereof the aperture angle is the angle of total reflection on the exit face 5.

For this purpose a crystal 2 of index $n_c$ is used whereof the exit face 5 is polished and coupled by an optical seal 4 of index $n_g$ to a segmented photodetector 3, preferably a Si-PMT coupled to rapid reading electronics, preferably of combined ASIC type. The output data of these electronics are temporal information (time of arrival of the first UV photons on each pixel), if necessary the integration of the number of photons on each pixel during a given time Ti less than 2 ns, and integration of the number of photons detected on each pixel over a (long) period greater than 50 ns.

For each event, the temporal information and distribution of the first photons detected estimate the position and diameter of the disc which contains all the unscattered photons, as indicated by international application No. PCT/FR2013/052672. Hereinbelow, the number of photons detected only in this zone (in the disc) is counted for a period which depends on the characteristics of emission of the scintillator, typically 2 to 3 times the decay time τ to produce a number of adequate events.

For an interaction (X, Y, Z, T), calculation according to the method of the present invention is done as follows: first detecting a first photon (x1, y1, t1) and its time of arrival (trigger) is measured precisely. Then, the coordinates (xn, yn, tn) of the following n photons are counted for a period Ti equal of 2 to 6 times the transfer time (Tc). The period of the optimum integration time depends slightly on the geometry of the scintillator (plate, cylinder . . . ). This optimum time can be found by simulation for a given geometry. From the localisation of the n first photons the diameter of the spot of the detected unscattered photons and the position of the interaction X, Y, are estimated according to the teachings of international application No. PCT/FR2013/052672. The diameter of this spot (or disc) allows to estimate the position Z of the interaction in the scintillating crystal 2 and therefore precisely estimates the instant T of the interaction. Then, the number of photons detected on this spot (or disc) of unscattered photons is counted for a much longer period, ideally two to three times the decay time τ of the scintillator (for example greater than 50 ns for LaBr3). The objective here is to obtain more than 50% of the unscattered photons emitted by the interaction. Said number of unscattered photons is proportional to the energy of the gamma photon and is independent of the geometry of the scintillating crystal; it is little affected by pile-up and therefore allows calculating the energy of the gamma photon with an error less than that obtained according to the prior art.

In current photodetectors, detection of photons is subject to threshold effects. If the aim is to reject the background noise of the detectors (dark counts) it is necessary to detect 1.5 to 2 photoelectrons. Since the integration time Ti is brief, typically less than 2 ns, the number of photons to be detected during Ti can be less than the threshold for the peripheral pixels. The number of photons emitted by interaction in the angular sector of the unscattered photons is constant. The density of photons/pixels depends on the diameter of the disc. The maximum diameter of the disc depends on the thickness of the crystal. We can therefore play on the density of photons/pixels by varying the thickness of the crystal. Thus, the more the detector will be finely segmented, the more it can be advantageous to use thinner crystals.

Also the integration time Ti (less than 2 ns) being brief with respect to the possibilities of the best current electronics, it is advantageous to search for means which allow to count the photons longer. The integration time is given by the time on completion of which the number of photons detected outside the disc of unscattered photons passes a certain threshold (for example 90%). Passing this threshold depends essentially on the number of photons scattered on the entry face 1 of the crystal, or on the lateral faces for the pixels located at less than a thickness of crystal from the edges. Given that for a temporal imager, only the unscattered photons can be used for measuring X, Y, Z, T, E, it can be advantageous to delete all the others photons.

A known way to do this may be to paint the lateral faces and the entry face 1 in black to absorb all the photons which leave the crystal. However, given that the index of the paint (typically 1.5) is less than the index of the crystal 1.8 to 1.9, a majority of the photons is reflected by the index step and disrupts the signal. More advantageously way of executing the invention is therefore either to find a black product of index near that of the scintillator, or to conduct anti-reflective treatment by any means known on the lateral faces and the entry face 1 of the crystal 2 and apply a dark absorbent deposit on this anti-reflective treatment.

Another way to get this result can be to deposit on those faces not used for detecting the crystal 2 a high 'n' index resin (n greater than 1.5) preferably n greater than 1.7, loaded with absorbent particles.

This treatment has the following advantages: sharply decreasing the number of photons detected outside the light cone of the unscattered photons increases the time during which the first photons can be counted to define the position of the circle.

This system also substantially limits the edge effects and therefore exploits the whole detector for imaging.

This anti-reflective treatment can be performed via interference layers, photonic crystals or progressive index adaptation obtained by nanostructuring such as disclosed in European application No. 14305365.0 filled on Mar. 13, 2014 "Structuring for optimizing the collection of photons in scintillating crystals and associated technological solutions".

The calculation method according to the invention is independent of the geometry of the crystal from the moment when it is possible to correctly recognise the form of the spot of unscattered photons and when the period of integration Ti is corrected from the value of Tc. The optimum value of Ti depends in effect on Tc and the geometry of the crystal. Consequently, the scintillating crystal can have different geometry in the form of plate, cylinder, bar etc.

If the theoretical resolution $E_{th}$ of a scintillator is considered, linked to collection of all the photons for a single event, the system according to the invention measures the energy of the event with an energy resolution less than twice the theoretical resolution of the scintillator.

Also, this type of signal processing can be conducted in any case where the scintillator has emitted enough photons (10 to 100) in two to six times the transfer time (Tc) so that the place of the unscattered photons can be localised. This implies, for a very rapid and luminous scintillator of LaBr3 type, that the method could function for gamma ray energy of around 50 KeV. For a slower and less luminous scintillator such as BGO and NaI (Ti), the method becomes applicable when the photons to be detected have energy greater than 1 MeV.

In the case where a second gamma photon impacts the scintillator more than 1000 picoseconds after the first impact and during the counting period Ti of a first interaction (pile-up), if the discs of unscattered photons are not combined in the plane of the detectors, the two events could be counted independently and therefore the energy of the two events could be measured correctly. If the two discs are combined, analysing the spatio-temporal distribution of detected photons could determine that the event is not correct and it could be rejected.

In the case where the gamma photon undergoes a Compton deviation before being absorbed, the following two cases will be considered:

The Compton γ photon remains in the same light cone (deviation less than θc). This case is the most current. In this case the unscattered photons emitted by the interaction all stay in the same light cone, but their distribution can present asymmetry i.e. a dense disc included in a scattered disc. In this case measuring energy is done by counting the number of photons in the vastest light cone, as if there were no Compton effect.

The Compton γ photon leaves the light cone. The result is separate events (two circles) simultaneous in time, contrary to the case of pile-up. Two options are possible according to the quality of the electronic components, including:

Rejecting the event as not valid;

Verifying that after the integration time (Ti*Number of spot photons 1+Number of spot photons 2=number of photons allowed for the energy considered). In this case the correct position of the event remains in the largest circle. In this way, the energy of the event can be obtained by adding the photon counts in the 2 circles (or spots or discs).

Adding a photomultiplier for example of SI-PMT type and a rapid combined microelectronic component of ASIC type to an existing scintillating crystal improves its performance. This reuses the crystals in the case where the value of the latter is considerable with respect to the value of the complete detector.

Figure 2A:
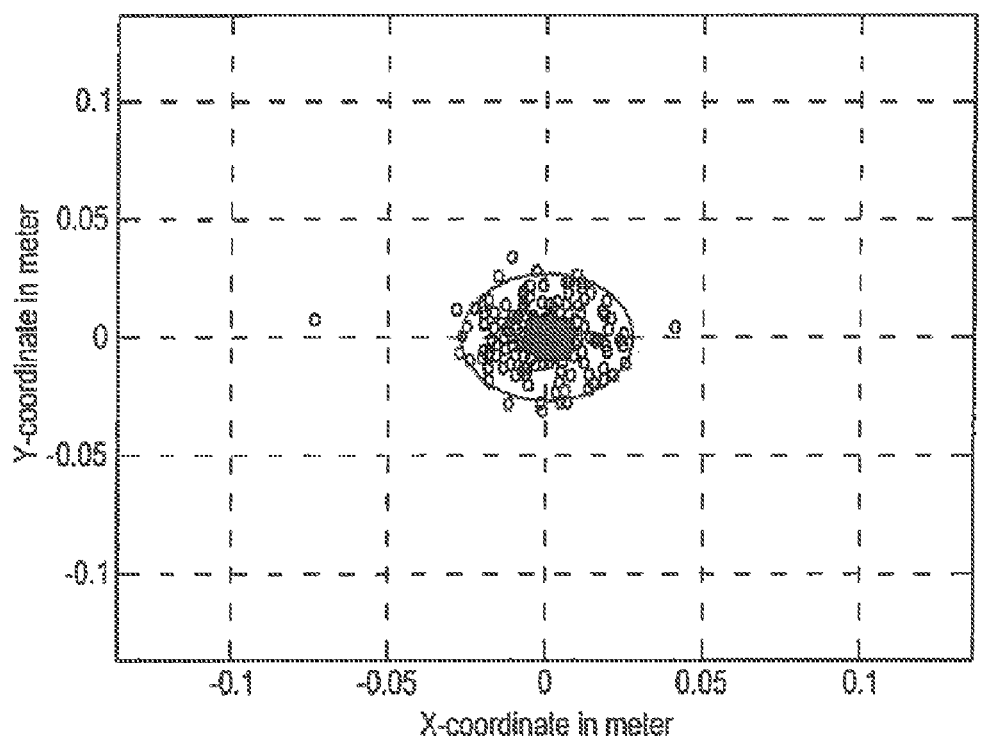
FIG. 2A shows a cartography of the photons detected by the Si-PMT for radiation of 511 KeV in the case of a scintillation event occurring with Z=5 mm and for an integration time of Ti=700 ps.
Figure 2B:
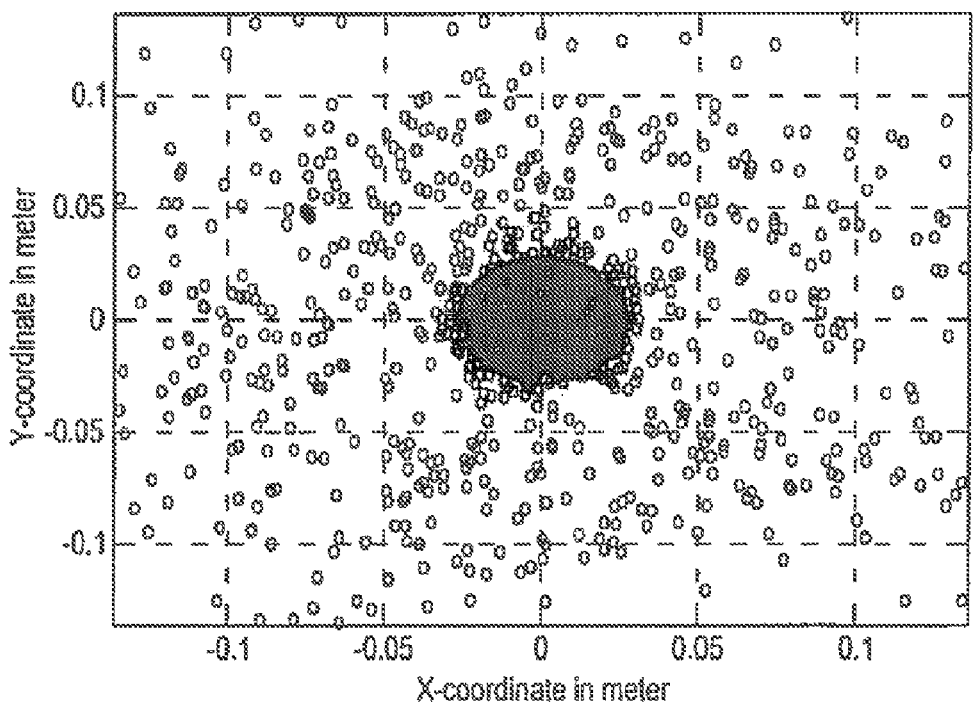
FIG. 2B shows the same event for an integration time of Ti=2900 ps.

FIGS. 2A and 2B correspond to digital simulation of Monte-Carlo type in the case of a plate of LaBr3:Ce of thickness 30 mm, with scattering entry surface 1. (Tc=200 ps).

More precisely, FIGS. 2A and 2B show the measuring of radiation of 511 KeV in the case of an interaction taking place in (x, y, z, t) with a depth of interaction Z=5 mm and different time after initial interaction.

Example 1: Let is be a monocrystal plate LaBr3 of thickness 30 mm. The entry face 1 is scattering and covered with a reflecting white film. It shows the position Z=0. The lower face 5 is polished. It shows the position Z=30; and via an optical seal 4 of index ng=1.4 a segmented photodetector 3 for example a Si-PMT is bonded on the lower face 5. The information is read by a microelectronic component of rapid combined ASIC type (not shown). The data hereinbelow have been adapted (by simulation) to the geometry and size of the relevant scintillator. This microelectronic component ASIC measures the time of arrival of the first photon on each pixel then counts the number of photons for example over 700 ps between the first photon detected (t1) and t1+700 ps. Then, it integrates the number of photons on the only pixels which have been activated during the 700 ps following the initial event, during a period for recovering more than 50% of photons emitted by the scintillator in this solid angle, or around 60 ns in the case of LaBr3.

Radiation of 511 KeV is measured in the case of pure photoelectric interaction having occurred at X, Y, Z, T. The images represented by FIGS. 2A and 2B correspond to Z=5 mm for different transfer times Tc. The circle represents the limits of the cone of unscattered photons.

The best definition of the circle is obtained in this configuration for Tc=700 ps. (FIG. 2A). Around 100 photons were detected, including 95% in the circle. This determines the coordinates and the radius of the circle with the following precisions in millimeters.

|  | $\hat{X}_0 - X_0^*$ | $\hat{Y}_0 - Y_0^*$ | $\hat{Z}_0 - Z_0^*$ | $\hat{T}_0 - T_0^*$ |
|---|---|---|---|---|
| Z = 5 mm | 0.0042 | 0.01 | 2.8 | 10.3 |
| Z = 10 mm | 0.0031 | 0.03 | 4 | 35.07 |
| Z = 15 mm | 0.017 | 0.002 | 6.3 | 52.47 |
| Z = 20 mm | 0.0142 | 0.02 | 9.3 | 64.72 |
| Z = 25 mm | 0.0009 | 0.01 | 12 | 75.95 |

Once the position and diameter of the disc are determined, the number of photons only inside the disc is counted, for a period of 60 ns. The result is around 7000 photons, which gives a good statistic on the energy resolution. Following this method an energy resolution of less than 3% in this configuration is obtained for LaBr3, as against 5 to 6% via a classic method for a plate like detector (Spect). Also the precision of the energy estimation for each photon detected is higher, which improves the efficiency of energy gating of the detector.

The system according to the invention can adapt to different energies of gamma rays (from 50 KeV to several MeV), and to different scintillating crystal geometries (cylinders, plates, bars, pixels . . . ). In these different situations, the integration time Ti will be varied such that Ti=2 to 6 transfer time (Tc). The transfer time Tc is the characteristic propagation time of light in a scintillator of index n and thickness H·Tc=H/(n/c).

The invention uses the fact that there are very rapid scintillators adapted to SPECT application and very rapid electronics for reading them (for example Si-PMT and dedicated microelectronic circuits of ASIC type) see the article by authors Pani, R., Vittorini, F., Pellegrini, R., Bennati, P., Cinti, M. N., Mattioli, M., and De Notaristefani, F. entitled "High spatial and energy resolution gamma imaging based on LaBr3 (Ce) continuous crystals" published in October 2008 in the journal Nuclear Science Symposium Conference Record, 2008.NSS '08. IEEE (pp. 1763-1771). This article shows highly promising characteristics of LaBr3:Ce crystal as a gamma ray imager. In particular the excellent energy resolution values (6% at 140 KeV and ~3% at 662 KeV) are obtained when the LaBr3:Ce crystal is coupled with a PMT.

In general, the first photons therefore fill a sphere the diameter of which increases over time at a speed v=c/n. The image of this sphere on the plane of the detectors is a circle the diameter of which increases to reach a limit angle Theta L is reached. These UV photons are propagated at the speed of light (c/n) in the material with n=1.9, the index of the medium. then, the difference between the direct photons and the scattered photons will be made.

In a LaBr3 type scintillator whereof the rise time to the light peak is approximately 800 ps, the resolution of the detection in terms of energy is enhanced by counting the unscattered photons detected for a given time greater than the rise time (rise time to the light peak) of the scintillator (800 ps for LaBr3) on a certain disc including the spot (disc) of the first triggers (for example a disc whereof the diameter is twice the diameter of the spot).

Generally, in a monolithic plane detector, the energy resolution is degraded with respect to the theoretical optimum. The energy resolution is indeed linked with the number of photons detected for a given energy event. In a plane detector, most of the photons detected have undergone multiple scattering from the point of emission thereof. During this scattering, a variable percentage of photons are lost. The present invention provides a significant solution, by only counting the unscattered photons from the light cone, the specific proportional number of photons/energy relationship for the scintillator is found. As such, it is possible to obtain an energy resolution of the order of 3% with LaBr3:Ce.

The invention further relates to a microelectronic component of the combined ASIC type for reading a photodetector of the detection system such as described hereinabove. Said combined microelectronic component comprises an analogue part for measuring a rapid event and a digital part for measuring the time of arrival of the first photons (triggers), counting the number of photons detected for each pixel. Said component also integrates the number of photons detected during 2 to 3 times the decay time of the scintillator.

It is also advantageous to reconstitute the image of the disc of unscattered photons to know an estimation of the number of photons which have impacted each segment of the detector 3 during the integration time. This can be done rigorously by digitizing the load signal all the nanoseconds, though this requires substantial calculation power. An alternative method with simpler electronics is to obtain a trigger (Tr) indicating the instant of arrival of the first photon on this segment for each segment of the detector 3. Only the trigger Tr−Tr0<n*TC, with n determined by modeling, is considered for determining the circle of unscattered photons. So the probability of detection of a photon beyond the circle is less than a predefined threshold (for example Tc=200 ps for a plate of LaBr3 of 30 mm of thickness. N=3.5 for a threshold at 95%).

The system according to the present invention can be used in gamma imagers of SPEC or PET type to improve the energy resolution of the scintillators.

The system according to the invention can also be used to construct imager spectrometers such as Compton camera.

Numerous combinations may be envisaged without leaving the scope of the invention; those skilled in the art will choose one or the other according to the economic, ergonomic, dimensional or other constraints to be fulfilled.

The invention claimed is:

1. A method for improving the energy resolution of a gamma radiation detector comprising a monolithic scintillator and a segmented photodetector, during a scintillation event, the method comprising:
   detecting the time of arrival of the first photons on each segment of said photodetector;
   counting for a period $T_i$ so-called "integration time" consist of between 2 and 6 times a transfer time (Tc), the number of first detected photons so called "unscattered photons", and determining their localisation;
   determining the diameter and position of a disc inside which are arranged said unscattered photons;
   determining the position (X, Y) of a scintillation event from the localisation of said unscattered photons;
   counting the number of said unscattered photons arranged inside said disc for a period $T_d$ so-called "counting time" greater than a decay time ($\tau$) of the scintillator;
   defining the energy of a gamma photon, said energy being proportional to the number of said unscattered photons counted inside said disc during the counting time period $T_d$.

2. The method for improving the energy resolution of a detector according to claim 1, wherein the unscattered photons inside the disc are counted over a period equal to around 2 to 3 times the decay time ($\tau$) of said scintillator to reduce the uncertainty of the measurement of the energy of each gamma photon.

3. The method for improving the energy resolution of a detector according to claim 1, wherein the position Z of the interaction is estimated as a function of the diameter of the disc of the unscattered photons, said position Z being the depth of said interaction.

4. The method for improving the energy resolution of a gamma radiation detector of claim 1, wherein the monolithic scintillator is a scintillating crystal in the form of a monolithic plate with lateral faces and an entry face for measuring the distribution of light in a PET application, wherein said lateral faces and the entry face are first processed to avoid reflection by index step then covered with a black absorbent to cancel out the reflection on said surfaces.

5. A system for detecting gamma radiation for executing the method according to claim 1, comprising a scintillating crystal with an entry face and an exit face polished and coupled by an optical seal (4), to a segmented photodetector, said photodetector being read by a microelectronic component, wherein the system is able to measure the time of arrival of the first photons for a period of around 2 to 6 times a transfer time (Tc), measuring the number and determining the localisation of said first photons, determining the diameter and the position of a disc inside which a set of unscattered photons is arranged, the maximum diameter of said disc being proportional to the thickness of said scintillating crystal, and in that it is able to count the number of unscattered photons detected for a period of around 2 to 3 times a decay time ($\tau$) of said scintillator for each pixel to measure the energy of a single gamma photon with a precision greater than twice the theoretical resolution of the scintillating crystal for a given energy.

6. The system for detecting gamma radiation according to claim 5, wherein the microelectronic reading component is either integrated into a photodetector of digital Si-PM type, or in the form of a separate component of ASIC type.

7. The system for detecting gamma radiation according to claim 6, wherein the scintillating crystal has geometries in the form of a plate, cylinder or bar.

8. The system for detecting gamma radiation according to claim 6, wherein the scintillating crystal is a lanthanum halide or a lutetium silicate for energy radiation greater than 100 KeV.

9. The system for detecting gamma radiation according to claim 6, wherein the scintillating crystal is any type when the photons to be detected have energy greater than 1 MeV.

10. The system for detecting gamma radiation according to claim 5, wherein the scintillating crystal has geometries in the form of a plate, cylinder or bar.

11. The system for detecting gamma radiation according to claim 10, wherein the scintillating crystal is a lanthanum halide or a lutetium silicate for energy radiation greater than 100 KeV.

12. The system for detecting gamma radiation according to claim 10, wherein the scintillating crystal is any type when the photons to be detected have energy greater than 1 MeV.

13. The system for detecting gamma radiation according to claim 5, wherein the scintillating crystal is a lanthanum halide or a lutetium silicate for energy radiation greater than 100 KeV.

14. The system for detecting gamma radiation according to claim 13, wherein the scintillating crystal is any type when the photons to be detected have energy greater than 1 MeV.

15. The system for detecting gamma radiation according to claim 5, wherein the scintillating crystal is any type when the photons to be detected have energy greater than 1 MeV.

16. The detection system according to claim 5, wherein said scintillating crystal is coupled on the entry surface and on the exit face to a segmented photodetector to enhance precision of measuring the energy resolution.

17. The system for detecting gamma radiation according to claim 5, wherein the scintillating crystal is in the form of a monolithic plate with lateral faces and an entry face for measuring the distribution of light of a scintillation event at 511 KeV, wherein said lateral faces and the entry face are covered with an index resin n>1.7, said resin is loaded with absorbent particles to cancel out the reflection on said surfaces.

18. A method for improving the energy resolution of a gamma radiation detector which comprises utilizing the system for detecting gamma radiation according to claim 5 for improving the energy resolution of scintillators in gamma imagers of SPECT or PET type.

19. A microelectronic component of combined ASIC type used for reading a photodetector of a detection system according to claim 1, the microelectronic component comprises an analog part able to measure an event with a time precision of the order of 100 ps and a digital part, said component being able to measure the time of arrival of the first photons, counting for a period Ti so-called integration time equivalent to 2 to 6 times a transfer time (Tc), the number of photons detected for a pixel, and integrating the number of photons detected for a period Td of the order of 2 to 3 times a decay time ($\tau$) of the scintillator.

20. The microelectronic component of combined ASIC type used for reading a photodetector of a detection system according to claim 19, wherein the microelectronic component is able to send a time signal when the load of photons which have impacted a pixel of the detector, during the integration time Ti, exceeds a predefined threshold.

* * * * *